(12) United States Patent
Schmidtke et al.

(10) Patent No.: US 10,393,874 B2
(45) Date of Patent: Aug. 27, 2019

(54) DISTANCE MEASURING DEVICE

(71) Applicant: Robert Bosch GmbH, Stuttgart (DE)

(72) Inventors: Bernd Schmidtke, Leonberg (DE);
Uwe Skultety-Betz,
Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 14/753,593

(22) Filed: Jun. 29, 2015

(65) Prior Publication Data

US 2016/0003944 A1 Jan. 7, 2016

(30) Foreign Application Priority Data

Jul. 2, 2014 (DE) ........................ 20 2014 005 508

(51) Int. Cl.
*G01S 7/481* (2006.01)
*G01S 17/08* (2006.01)
*G01S 7/497* (2006.01)

(52) U.S. Cl.
CPC .............. *G01S 17/08* (2013.01); *G01S 7/481* (2013.01); *G01S 7/4811* (2013.01); *G01S 7/497* (2013.01)

(58) Field of Classification Search
CPC ........ G01S 17/08; G01S 7/481; G01S 7/4811; G01S 7/497
USPC ....................................................... 356/4.07
See application file for complete search history.

(56) References Cited

U.S. PATENT DOCUMENTS

| | | | | |
|---|---|---|---|---|
| 1,950,482 | A * | 3/1934 | Cawley ..................... | H04N 3/04 348/202 |
| 6,384,663 | B2 * | 5/2002 | Cova .......................... | G01J 1/44 250/214 A |
| 6,781,675 | B2 * | 8/2004 | Gogolla ..................... | G01S 7/481 356/4.01 |
| 8,858,030 | B2 * | 10/2014 | Avramescu ......... | H01S 5/02461 362/231 |
| 9,048,370 | B1 * | 6/2015 | Urmson ................. | H01L 31/107 |
| 2013/0229645 | A1 * | 9/2013 | Suzuki .................... | G01S 17/02 356/5.01 |
| 2013/0265590 | A1 * | 10/2013 | Eisele .................. | G01S 7/4816 356/625 |
| 2015/0212240 | A1 * | 7/2015 | Cai ...................... | G02B 5/0808 428/448 |

FOREIGN PATENT DOCUMENTS

DE 10 2004 023 998 A1 12/2005
WO WO-2012045503 A1 * 4/2012 ........... G01S 7/4816

OTHER PUBLICATIONS

"Gaussian beam," Wikipedia 2013, downloaded Nov. 19, 2017 from https://en.wikipedia.org/w/index.php?title=Gaussian_beam&oldid=560465837, 6 pages.*

* cited by examiner

*Primary Examiner* — Daniel L Murphy
(74) *Attorney, Agent, or Firm* — Maginot, Moore & Beck LLP

(57) ABSTRACT

The disclosure proceeds from a distance measuring device comprising at least one distance measuring unit, which is in particular suitable for a contactless distance measurement, which has at least one transmission device for emitting reference and measurement radiation and at least one sensor device for detecting reference and measurement radiation. It is proposed that, in the distance measuring device according to the disclosure, the reference radiation is embodied as at least one partial beam of divergent radiation emitted by the transmission device.

17 Claims, 5 Drawing Sheets

DISTANCE MEASURING DEVICE

This application claims priority under 35 U.S.C. § 119 to application no. DE 20 2014 005 508.4, filed on Jul. 2, 2014 in Germany, the disclosure of which is incorporated herein by reference.

BACKGROUND

The present disclosure relates to a distance measuring device comprising at least one distance measuring unit, in particular for a contactless distance measurement, which has at least one transmission device for emitting reference and measurement radiation and a sensor device for detecting reference and measurement radiation.

Distance measuring instruments, in particular optical distance measuring instruments, which emit a time-modulated beam, in particular a light beam, in the direction of a target object, the distance of which from the measuring instrument is intended to be established, are known. A returning beam, in particular light beam, reflected or scattered by the targeted target object is at least partly detected by the instrument and used for establishing the distance to be measured. A typical measurement range in this case lies in a distance range from a few centimeters to several hundred meters. The established distance measurement value is subsequently output to the user on an output device, for example in the form of a display.

In order to obtain a high measurement accuracy using such an instrument, the instruments typically have an instrument-internal reference section with a known length, via which the transmission radiation can be guided directly onto a reception apparatus of the measuring instrument, e.g. a detector. The internal reference section serves for calibrating the measurement instrument and, in particular, for taking into account short-term drifts of the components of the device for the distance measurement, as occur, for example, as a consequence of temperature variations or mechanical tensions.

DE 102 004 023 998 A1 has disclosed a device for optical distance measurement, in which there are
- a transmission branch defining a transmission channel, which has at least one transmission unit for emitting modulated, optical transmission radiation in the direction of the target object,
- a reception branch defining a reception channel, comprising at least one reception apparatus for receiving reception radiation, and
- a reference branch defining a reference section.

Mechanically operated switching means in the form of adjustable reflecting flaps allow temporary redirection of the transmission radiation between the transmission branch and the reference branch such that the transmission radiation is redirected within the instrument and directed onto a photodiode via a reference section with a known length.

SUMMARY

The distance measuring device according to the disclosure assumes a distance measuring device comprising at least one distance measuring unit, in particular for a contactless distance measurement, which has at least one transmission device for emitting reference and measurement radiation and at least one sensor device for detecting reference and measurement radiation, wherein, according to the disclosure, the reference radiation is embodied as at least one partial beam of divergent radiation emitted by the transmission device.

The distance measuring device can be embodied as a stationary device or else as a hand-held device and, in particular, also be installed as a component in other measuring systems.

The transmission device comprises at least one device for generating and emitting visible or invisible radiation. Radiation is understood to mean electromagnetic radiation of the whole electromagnetic spectrum, in particular also UV radiation, radio waves, infrared radiation and visible light.

In an advantageous embodiment, the transmission device of the distance measuring device according to the disclosure comprises a light source, for example in the form of an LED, a laser, a semiconductor laser or a laser diode, which, in particular, emits time-modulated light in the direction of the target object. Here, time modulation can be implemented continuously and/or periodically, for example in a sinusoidal manner. It is likewise also possible to emit pulse trains, for example in a non-periodic manner such as e.g. in the form of so-called pseudo-noise pulse sequences.

In particular, the transmission device can also comprise a plurality of radiation emitting devices of a uniform or non-uniform type.

The radiation emitted by the transmission device is considered to be divergent to the extent that the radiation is emitted by at least one spatially restricted source over at least one solid angle. In particular, there is no collimation of the emitted radiation to form parallel or convergent radiation in the device according to the disclosure for branching off reference radiation.

The radiation emitted by the transmission device at least comprises the reference and measurement radiation, with, advantageously, the reference radiation being embodied as at least one partial beam of the divergent radiation emitted by the transmission device.

The sensor device of the distance measuring unit is embodied for detecting reference and measurement radiation, with a sensor device intending to be understood to mean at least one detector element, synonymously also a light-sensitive element, a detector or a detection region, which supplies a detection signal dependent on an incident light intensity.

In a particular advantageous embodiment, the at least one detector element of the sensor device is formed by at least one area detector, which is assembled from a plurality of light-sensitive elements that are coupled, or not coupled, to one another. Coupled is intended to be understood to mean that a common output signal can be generated.

In particular, the sensor device can also have spatially separated detector elements, preferably also in the form of area detectors, for detecting the reference and measurement radiation.

Detector element is understood to mean radiation-sensitive, in particular light-sensitive, elements such as photodiodes, e.g. PIN diodes or avalanche photodiodes (APD), and also (modulated) CCD chips and CMOS pixels.

In an advantageous embodiment, the at least one detector element is formed by single photon avalanche diode (SPAD), in a particularly advantageous embodiment by a plurality of uncoupled or coupled SPADs.

The distance measuring device moreover has an evaluation unit, which is configured to establish the distance between the measuring device and the target object on the basis of an evaluation of detector signals from the sensor device. In particular, the evaluation unit can be embodied in the form of the microprocessor.

An output unit, for example in the form of a display attached to the housing surface, a speech output or a communication interface, for example using WLAN, Bluetooth or infrared protocols, serves to output the evaluation result to the user or forward the value to a further instrument for further processing.

Compared to the distance measuring instruments known from the prior art, the distance measuring device according to the disclosure in particular enables a simplified setup of the components, in particular the optical components, contained therein. In particular, a comparatively compact embodiment of the reference unit for measuring the device-internal reference section in order to calibrate the distance measuring device can be achieved. A more economical embodiment and manufacture of the reference unit, especially in view of costs and manufacturing tolerances, can therefore be realized.

A more precise calibration as a consequence of smaller time-of-flight errors and time-of-flight drifts can moreover be achieved by avoiding mechanically movable components in the reference unit, such as e.g. reflecting flaps.

According to the disclosure, it is rendered possible to provide reference radiation permanently for calibration purposes during the operating time of the distance measuring device since no mechanical actuators, such as e.g. a reflecting flap, are temporarily introduced into the transmission beam of the distance measuring device. Advantageously, it is therefore possible to realize a continuous measurement operation of the distance measuring device without interruption for calibration, i.e. without blocking the measurement radiation leaving the instrument by repositioning the mechanical actuation devices during the calibration process.

Preferably, the transmission device of the distance measuring device emits divergent radiation, which has a divergence angle-dependent beam profile and which is describable by an intensity distribution function which drops off to the edge regions, with the reference radiation being embodied as a partial beam of the divergent radiation, emitted by the transmission device, in at least one of these edge regions.

Here, in the cross section through the beam, the divergence angle-dependent beam profile comprises, in particular, a profile which can be described, as a function of the divergence angle, by a Gaussian distribution, a Lorentz distribution, a Voigt distribution, a convolution of these distributions or by any other probability distribution function.

The light emitted by edge-emitting laser diode is typically very divergent, wherein two different divergences $Q_I$ and $Q_\perp$ occur due to different extents of the active zone of the laser parallel and perpendicular to the pn-junction. As a consequence, anisotropic (asymmetric) radiation is emitted overall. Depending on the alignment of the laser diode, particularly in view of a rotation of the laser diode about the emission axis thereof, the beam profile as a cross section through the beam can be varied and, consequently, be described by in each case different intensity distribution functions. Here, the beam profile of the edge emitting laser diode has, in the $Q_I$ direction, a small FWHM (small divergence) and, in the $Q_\perp$ direction, a large FWHM (large divergence) of the beam profile. This effect can be used for optimizing the reference radiation incident on the first detection region.

The edge region of the beam profile is defined to be at least that part of the radiation emitted by the transmission device for which the divergence angle-dependent intensity, described in a model-like manner by the intensity distribution function, falls below a specific limit value.

Alternatively, the part of the beam profile for which the divergence angle-dependent integrated intensity, in each case determined by the integral of the model-like intensity distribution function from a specific divergence angle, falls below a specific limit value can also be defined as the edge region.

Preferably, the reference radiation in this case constitutes an integrated intensity of less than 3 percent of the radiation emitted by the transmission device, particularly preferably an integrated intensity of less than 1 percent and, in particular, of less than 0.5 percent.

In accordance with a further embodiment, the distance measuring device is configured in such a way that the reference radiation is incident on a sensor device which has at least one first detection region for detecting reference radiation, with the first detection region in particular comprising at least one single photon avalanche diode (SPAD).

As SPADs, unlike conventional light-sensitive elements operating on an analog basis, typically do not supply a detection signal which is linearly dependent on the incident radiation but rather cause a single detection signal to be generated for each incident photon, it is possible in the aforementioned preferred embodiment of the distance measuring device to detect significantly lower intensities of the reference radiation in the first detection region. In particular, as already described above, it is possible, instead of an individual SPAD, to combine a plurality of SPADs in a coupled or uncoupled manner within an area detector.

In a further embodiment of the distance measuring device, there is, in addition to the first detection region for detecting reference radiation, at least one second detection region which is provided for detecting the measurement radiation.

In particular, this second detection region can be embodied for detecting the measurement radiation by means of at least one SPAD, preferably also by means of a plurality of SPADs, combined in a coupled or uncoupled manner in the form of an area detector. Here too, the radiation intensity of the measurement radiation required for detecting the measurement radiation can be significantly reduced by the use of SPADs.

In a further preferred embodiment of the distance measuring device, a reflector situated in the beam path of the reference radiation at least partly reflects the reference radiation onto the first detection region for detecting reference radiation.

Consequently, free positioning of the first detection region for detecting the reference radiation can be ensured. In particular, the first detection region for detecting the reference radiation can be configured directly adjacent to the second detection region for detecting measurement radiation.

Advantageously, the first and second detection region can also be realized as a single component, in particular in the form of an integrated semiconductor element.

In accordance with a preferred embodiment of the distance measuring device, the reflector is made of plastic and, for example, embodied in the form of a plastic injection molded part.

This allows particularly economical manufacturing of the reflector.

In a further preferred embodiment of the distance measuring device, the reflector is embodied as part of the holder supporting the optics of the distance measuring unit.

Therefore, the realization and, in particular, the manufacture of a reference unit, which is as compact as possible, for measuring the device-internal reference section for purposes of calibrating the measuring device can be simplified in relation to the manufacturing technology. In particular, the reflector as part of the holder supporting the optics of the distance measuring unit can be produced integrally, and therefore in a cost-effective manner, in an injection molding method.

Advantageously, the reflector of the distance measuring device according to the disclosure can be realized as a plane surface, the surface normal of which is aligned in such a way that the lustrously reflected reference beam is incident on the first detection region for detecting reference radiation.

In an alternative preferred embodiment of the distance measuring device, the reflector can be realized as a curved surface, in particular as a spherical hollow mirror, with the foci and the alignment of the surface being selected in such a way that the reflected reference beam is incident on the first detection region for detecting reference radiation and the optical efficiency is optimized, in particular maximized.

Radiation losses, as may occur by e.g. scattering, multiple refraction, reflection, shielding or inexpedient illumination of the first detection region, are minimized by using a reflector, more particularly a focally reflecting reflector, which precisely reflects onto the first detection region. As a consequence, the totality of the intensity available to the reference radiation can be minimized and a larger part of the radiation emitted by the transmission device is available for the measurement radiation emitted to the targeted object.

Advantageously, the reflector of the distance measuring device can also be embodied as an at least partly diffusely reflecting surface.

BRIEF DESCRIPTION OF THE DRAWINGS

Exemplary embodiments of the disclosure are presented in the drawings and are explained in more detail in the description below.

In the drawings.

DETAILED DESCRIPTION

Figure 1:
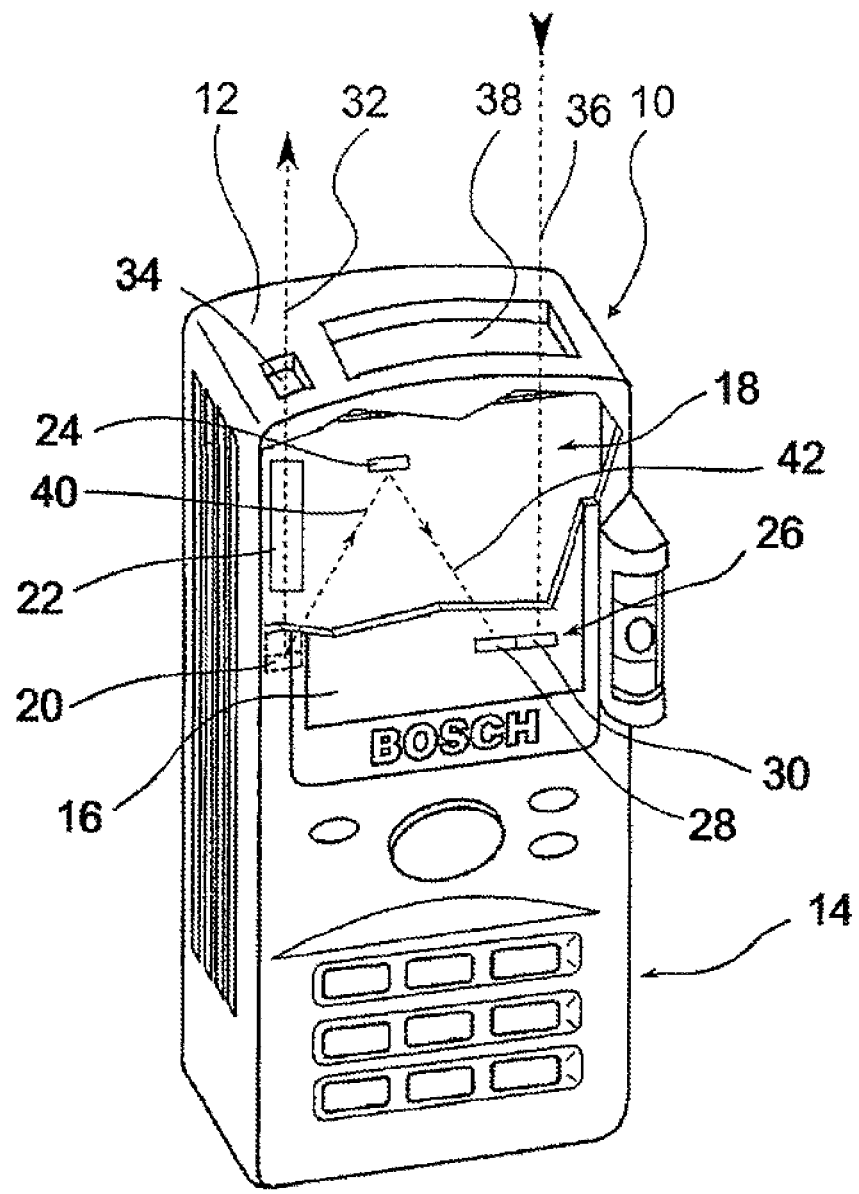
FIG. 1 shows a perspective illustration of one embodiment of the distance measuring device according to the disclosure.

FIG. 1 shows, in a perspective illustration, a hand-held distance measuring device 10, embodied in an exemplary manner, which comprises a housing 12, actuation elements 14 for switching the distance measuring device 10 on and off and for starting or configuring a measurement process, and a display 16. A transmission device 20, configured as a laser diode, for generating optical radiation, a light channel for shielding the transmission radiation 22, a reflector 24 for redirecting the reference signal and a sensor device 26 consisting of a first detection region 28 for detecting the reference radiation and a second detection region 30 for detecting the measurement radiation radiated back from the distant object (reception radiation) are arranged on a support element 18 within the housing 12 (in this respect, see also FIG. 2). In order to measure the distance of the distance measuring device from a distant article, parallel measurement radiation 32 is transmitted in the direction of the article via transmission optics 34, which for example consist of a confocal lens, when the distance measuring device 10 is in operation. The measurement radiation reflected by the surface of the distant article (reception radiation) 36 is guided via reception optics 38 to a sensor device 26, in particular to the second detection region 30 provided for detecting the measurement radiation, and detected there. A time-of-flight can be established from a phase comparison performed between the emitted measurement radiation 32 and the measurement radiation reflected by the surface of the distant article (reception radiation) 36 and the sought-after distance to the distant article can be determined via the speed of light.

A calibration (reference measurement) is performed during the distance measurement in order to compensate phase shifts, which are independent of the distance of the measuring device from the distant article and, for example, arise when generating the emitted measurement radiation and/or as a result of temperature variation. To this end, the reference radiation 40 emitted by the transmission device is redirected by the reflector 24 and directed directly onto the sensor device 26, in particular onto a first detection region 28 provided for detecting the reference radiation, via a known reference section along a reference path 42, and it is detected there.

Figure 2:
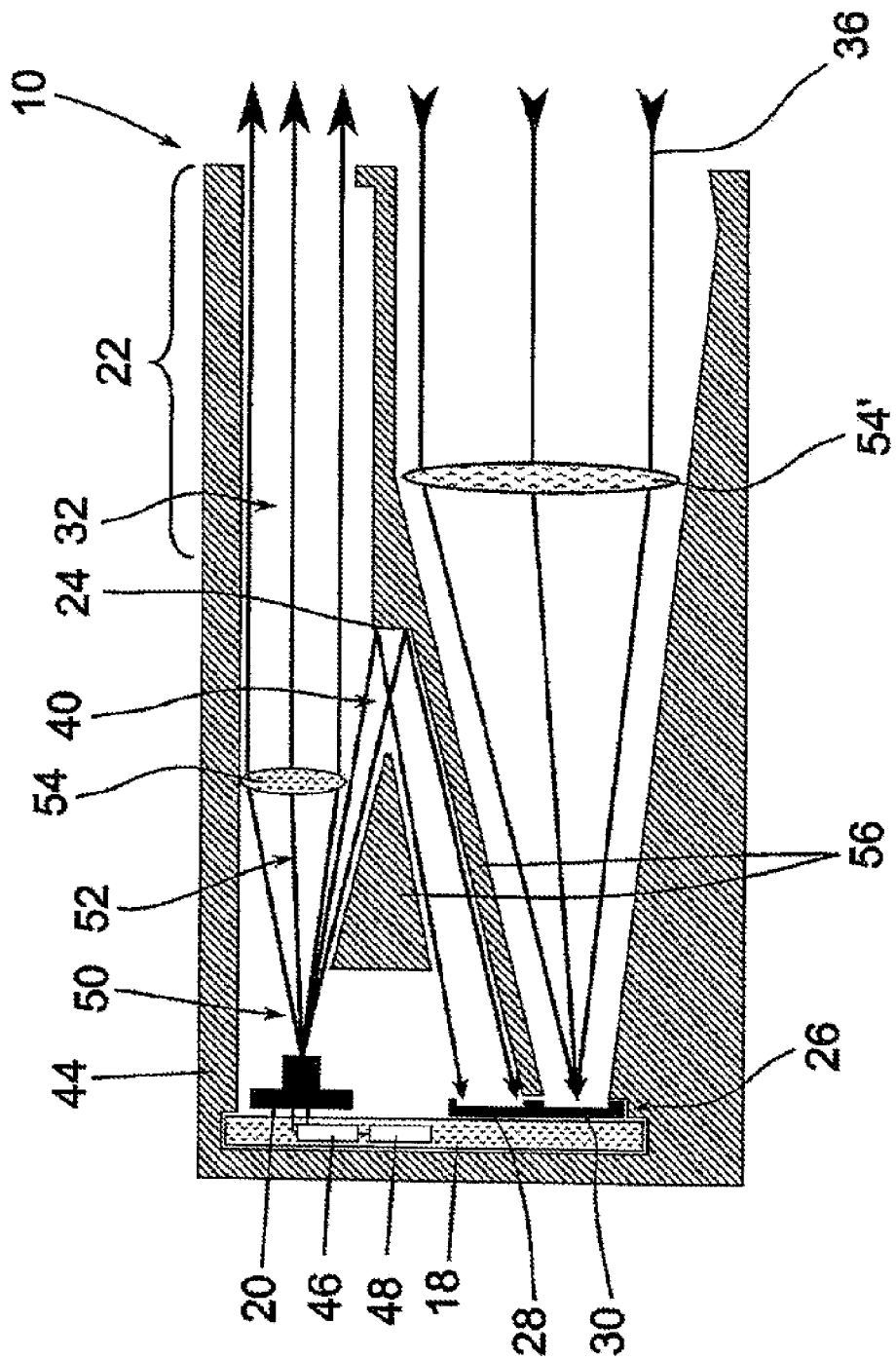
FIG. 2 shows an embodiment of the distance measuring device in a simplified schematic general overview.

FIG. 2 shows simplified schematic illustration of an embodiment of the distance measuring device 10 according to the disclosure. A support element 18 is housed in a holder 44, which supports the optics of the distance measuring unit, can consist of plastic and, inter alia, is producible by means of an injection molding method. In an advantageous embodiment, this support element is represented by the system circuit board, which is required for controlling the distance measuring device and, inter alia, can comprise the evaluation device 46 and an output device 48. A radiation emitting transmission device 20, which is realized by a laser diode in the example here, is applied to this support element 18. The laser diode radiates divergent light 50, wherein a partial beam 52 of the radiation emitted by the transmission device is collimated as measurement radiation 32 to form parallel light by means of a collimation lens 54, while a further partial beam represents the reference radiation 40. The measurement radiation 32 continues to propagate through a light channel of the transmission radiation 22 before it leaves the distance measuring device in the direction of a target object, the distance of which from the measuring instrument is intended to be established. At least some of the light reflected or scattered at the surface of the target object returns in the direction of the distance measuring device 10, where, as incident measurement radiation (reception radiation) 36, it is focused by a collimation lens 54' onto a sensor device 26, in particular onto a second detection region for detecting the measurement radiation 30.

The second detection region 30 depicted in this exemplary embodiment is embodied as an area detector consisting of a plurality of SPADs and can therefore detect extremely low incoming intensities of the measurement radiation returning from the surface of the distant object. The second detection region 30 is connected to the support element 18, in particular the system circuit board, in an electrically conductive manner such that a detection signal of the second detection region can be transmitted to the evaluation device 46.

The reference radiation 40 is decoupled/branched off from the divergent beam of the laser diode. In particular, the reference radiation is branched off in such a way that it does not propagate through the collimation lens 54 but rather propagates directly onto a reflector 24 provided in the housing interior, at which reflector the reference radiation is redirected and directed directly onto the sensor device 26, in particular onto the first detection region 28 provided for detecting the reference radiation, via a fixedly defined reference path. Advantageously, this first detection region 28 is likewise embodied as an area detector consisting of a plurality of SPADS and can therefore detect extremely low incoming intensities of the measurement radiation returning from the surface of the distant object. The detection signal can be forwarded to the evaluation device 46 via an electrically conductive connection to the support element 18, in particular to the system circuit board. The sensitive first detection region for detecting the reference radiation 28 is protected by optical barriers 56 from possible stray radiation, as may occur, for example, by side effects at the collimation lens 54 or 54'.

Figure 3:
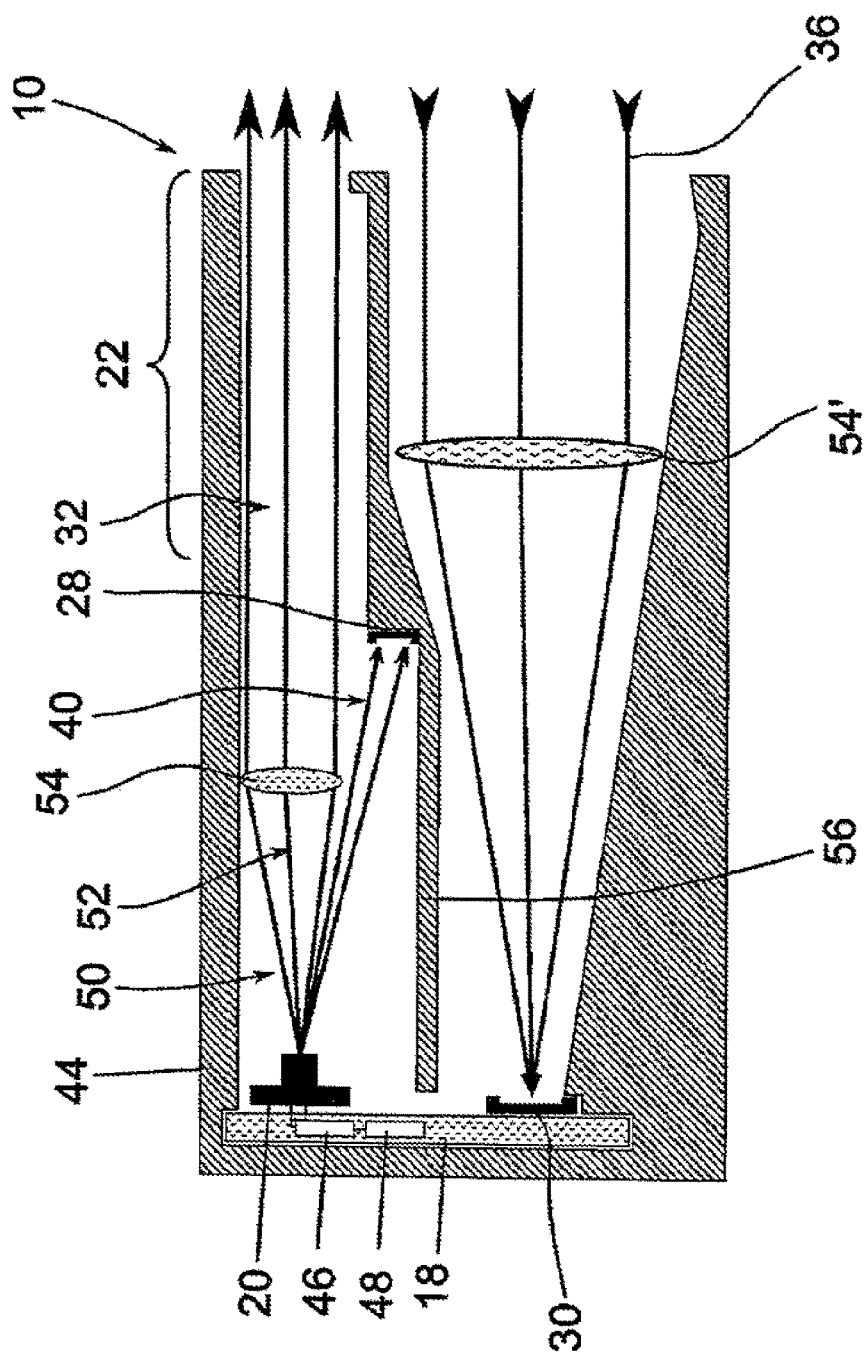
FIG. 3 shows an alternative embodiment of the distance measuring device in a simplified schematic general overview.

FIG. 3 shows, in a simplified and schematic manner, how the sensor device, with the second detection region for detecting the measurement radiation 30 and the first detection radiation for detecting the reference radiation 28 thereof, can be positioned at separate locations in the distance measuring device in a further advantageous embodiment of the distance measuring device according to the disclosure. There is no need for a reflector in this embodiment.

Figure 4:
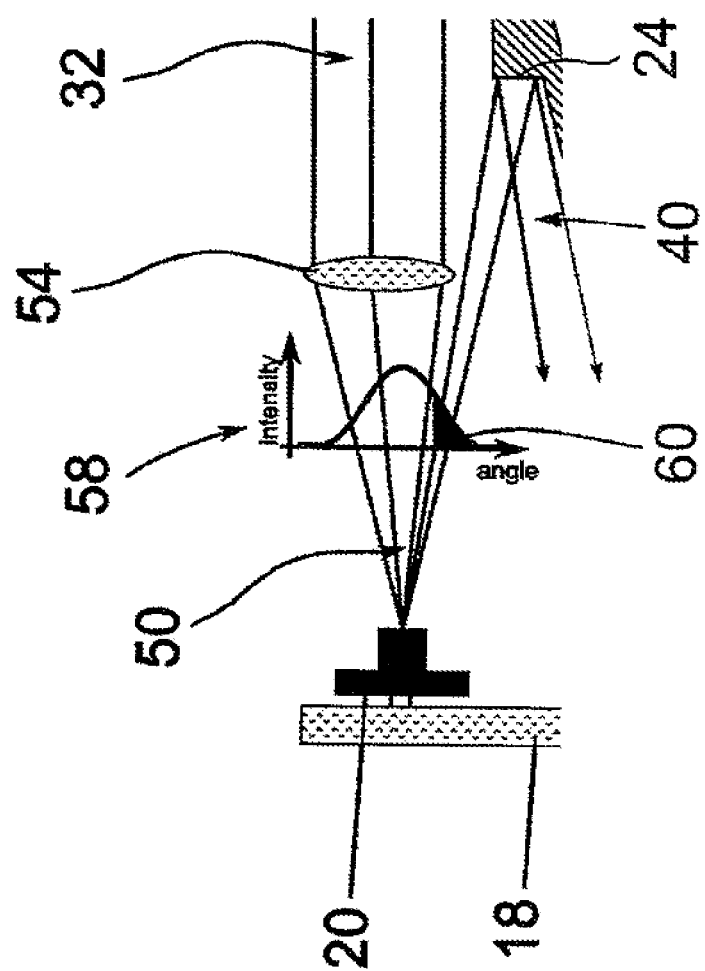
FIG. 4 shows a detailed view of one embodiment of the distance measuring device in a simplified schematic overall view.
Figure 5:
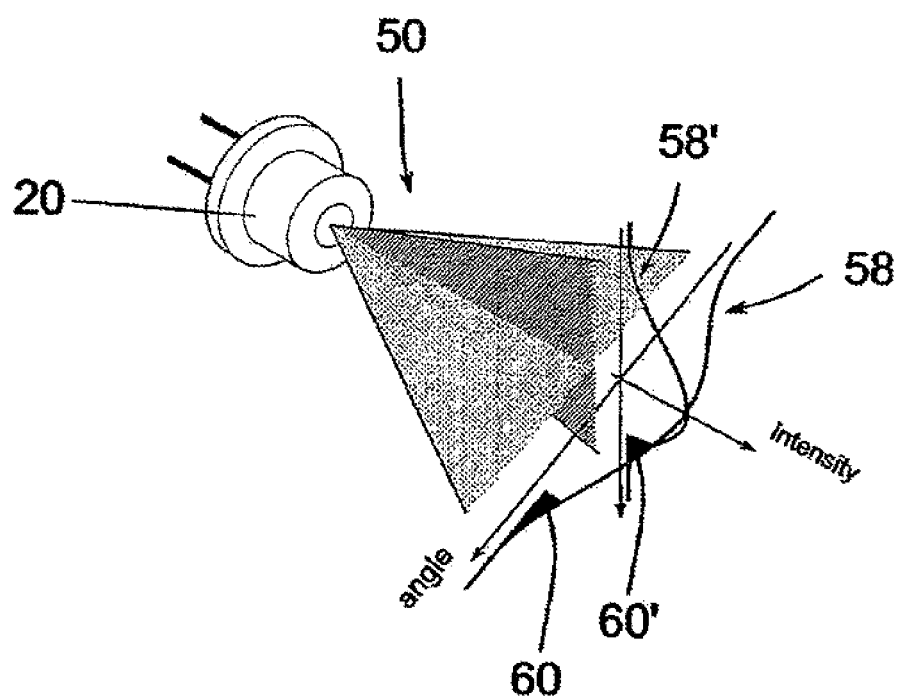
FIG. 5 shows, in a perspective view, a simplified illustration of a transmission device in the form of an edge-emitting laser diode with two exemplary beam profiles.

FIG. 4 depicts a detail of FIG. 2 in a magnified manner. A laser diode 20, which is fastened to a support element 18, in particular to the system circuit board, emits divergent light 50. A partial beam of the emitted divergent radiation 50, which constitutes the measurement radiation 32, is collimated by a collimation lens 54. A further partial beam 40 of the divergent emitted radiation 50 constitutes reference radiation, which is redirected by means of the reflector 24. The divergent radiation 50 emitted by the transmission device can be characterized by a divergence angle-dependent beam profile, which is describable by an intensity distribution function 58 which drops off to the edge regions. The reference radiation is embodied in an edge region of the beam profile as a partial beam of the divergent radiation emitted by the transmission device. 60 graphically depicts the integral of the intensity allotted to the reference radiation. In accordance with an advantageous embodiment of the distance measuring device according to the disclosure, the intensity of the reference radiation is less than 1 percent of the radiation emitted by the transmission device. In this exemplary embodiment, the measurement radiation constitutes the remaining partial beam 32 of the emitted divergent radiation 50. FIG. 5 shows, in a perspective, simplified illustration, a transmission device in the form of an edge-emitting laser diode 20, which typically emits anisotropic light 50 with different divergences $Q_f$ and $Q_\perp$ parallel and perpendicular to the pn-junction. Two beam profiles, which are perpendicular to one another and different in terms of the FWHM, i.e. the divergence angle, thereof, are depicted in an exemplary manner. When such a laser diode is used, the beam profile as a cross-section through the beam can be varied by aligning the laser diode 20, in particular by rotating the laser diode about the emission axis thereof, and consequently said beam profile can be described by in each case different intensity distribution functions 58 and 58'. This effect can be used for changing, in particular optimizing, the reference radiation 40, more precisely the integrated intensity 60 and 60' thereof, allotted to the first detection region 28.

What is claimed is:

1. A distance measuring device comprising:
   at least one distance measuring unit configured for contactless distance measurement, the at least one distance measuring unit comprising:
   at least one transmission device configured to emit a reference radiation and a measurement radiation, the reference radiation being embodied as at least one partial beam of divergent radiation;
   at least one sensor device configured to detect the reference radiation and the measurement radiation, the at least one sensor device comprising:
   at least one first detection region configured to detect the reference radiation and having at least one single photon avalanche diode (SPAD), the reference radiation being incident on the at least one first detection region;
   at least one second detection region configured to detect the measurement radiation; and
   an integrated circuit semiconductor component having both the first detection region and the second detection region, and
   a first optical barrier shielding a portion of the reference radiation from the measurement radiation, wherein:
   the at least one beam of divergent radiation that embodies the reference radiation has a divergence angle-dependent beam profile that is described by an intensity distribution function that drops off to edge regions; and
   the reference radiation is embodied as a partial beam of the divergent radiation that is emitted in at least one of the edge regions.

2. The distance measuring device according to claim 1, wherein the reference radiation has an integrated intensity that constitutes less than 3% of a combined integrated intensity of the reference radiation and the measurement radiation.

3. The distance measuring device according to claim 2, wherein the integrated intensity of the reference radiation constitutes less than 1% of the combined integrated intensity of the reference radiation and the measurement radiation.

4. The distance measuring device according to claim 3, wherein the integrated intensity of the reference radiation constitutes less than 0.5% of the combined integrated intensity of the reference radiation and the measurement radiation.

5. A distance measuring device comprising:
   at least one distance measuring unit configured for contactless distance measurement, the at least one distance measuring unit comprising:
   at least one transmission device configured to emit a beam of divergent radiation, wherein a first portion of the beam of divergent radiation forms a reference radiation and a second portion of the beam of divergent radiation forms a measurement radiation;
   at least one sensor device configured to detect the reference radiation and the measurement radiation, the at least one sensor device comprising:
   at least one first detection region configured to detect the reference radiation and having at least one single photon avalanche diode (SPAD), the reference radiation being incident on the at least one first detection region;
   at least one second detection region configured to detect the measurement radiation; and
   an integrated circuit semiconductor component having both the first detection region and the second detection region;

a first optical barrier shielding a portion of the reference radiation from the measurement radiation; and a reflector arranged in a beam path of the reference radiation and configured to at least partly reflect the reference radiation onto the at least one first detection region.

6. The distance measuring device according to claim 5, wherein reflector is made of plastic.

7. The distance measuring device according to claim 6, wherein the reflector is a plastic injection molded part.

8. The distance measuring device according to claim 5, further comprising:

a holder configured to support the distance measuring unit, wherein the reflector is embodied as part of the holder.

9. The distance measuring device according to claim 5, wherein the reflector has a plane surface that is aligned such that the reference radiation is reflected to be incident on the at least one first detection region.

10. The distance measuring device according to claim 5, wherein the reflector has a curved surface with a focus, the focus of the curved surface and the alignment of the curved surface being configured such that (i) the reference radiation is reflected to be incident on the at least one first detection region and (ii) an optical efficiency of the reflected reference radiation is maximized.

11. The distance measuring device according to claim 10, wherein the curved surface of the reflector comprises a spherical hollow mirror.

12. The distance measuring device according to claim 5, wherein the reflector is an at least partly diffusely reflective surface.

13. The distance measuring device according to claim 5, wherein:

the beam of divergent radiation has a divergence angle-dependent beam profile that is described by an intensity distribution function that is greater in a central region and is reduced in edge regions; and the first portion is emitted from at least one of the edge regions of the beam of divergent radiation.

14. The distance measuring device according to claim 5, further comprising:

a housing in which the at least one transmission device and the at least one sensor device are housed, wherein the measurement radiation is transmitted outside the housing, while the reference radiation is contained within the housing.

15. The distance measuring device according to claim 5, wherein the at least one transmission device is configured to emit time-modulated radiation as the beam of divergent radiation.

16. The distance measuring device according to claim 5, wherein:

the at least one distance measuring unit further comprises a second optical barrier positioned between a combined beam of the reference radiation and the measurement radiation upstream of the reflector, and the reference radiation downstream of the reflector, the first and second optical barriers form a light channel for the reference radiation downstream of the reflector.

17. A distance measuring unit for contactless distance measurement comprising:

at least one transmission device configured to emit a beam of divergent radiation, wherein a first portion of the beam of divergent radiation forms a reference radiation and a second portion of the beam of divergent radiation forms a measurement radiation;

at least one sensor device configured to detect the reference radiation and the measurement radiation, the at least one sensor device comprising:

at least one first detection region configured to detect the reference radiation and having at least one single photon avalanche diode (SPAD), the reference radiation being incident on the at least one first detection region;

at least one second detection region configured to detect the measurement radiation; and an integrated circuit semiconductor component having both the first detection region and the second detection region;

a first optical barrier shielding a portion of the reference radiation from the measurement radiation; and a reflector arranged in a beam path of the reference radiation and configured to at least partly reflect the reference radiation onto the at least one first detection region.

* * * * *